US009736883B2

(12) United States Patent
Guo et al.

(10) Patent No.: US 9,736,883 B2
(45) Date of Patent: Aug. 15, 2017

(54) METHOD AND APPARATUS FOR HANDLING INTER-NODE CONNECTIVITY IN A WIRELESS COMMUNICATION SYSTEM

(71) Applicant: INNOVATIVE SONIC CORPORATION, Taipei (TW)

(72) Inventors: Yu-Hsuan Guo, Taipei (TW); Meng-Hui Ou, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 51 days.

(21) Appl. No.: 14/167,405

(22) Filed: Jan. 29, 2014

(65) Prior Publication Data

US 2014/0211759 A1 Jul. 31, 2014

Related U.S. Application Data

(60) Provisional application No. 61/758,418, filed on Jan. 30, 2013, provisional application No. 61/768,761, filed on Feb. 25, 2013.

(51) Int. Cl.
*H04W 36/08* (2009.01)
*H04W 76/06* (2009.01)
(Continued)

(52) U.S. Cl.
CPC ......... *H04W 76/064* (2013.01); *H04L 5/0098* (2013.01); *H04W 36/28* (2013.01); *H04W 92/20* (2013.01)

(58) Field of Classification Search
None
See application file for complete search history.

(56) References Cited

U.S. PATENT DOCUMENTS

2011/0065440 A1* 3/2011 Kakani ................ H04L 1/0022 455/450
2011/0111785 A1* 5/2011 Lindoff ................ H04W 40/16 455/513

(Continued)

FOREIGN PATENT DOCUMENTS

EP 2448325 A1 5/2012
JP 11234719 A 8/1999

(Continued)

OTHER PUBLICATIONS

3GPP TS 36.321 V11.0.0 (Sep. 2012).

(Continued)

*Primary Examiner* — Anh-Vu Ly
*Assistant Examiner* — Hector Reyes Ortiz
(74) *Attorney, Agent, or Firm* — Blue Capital Law Firm, P.C.

(57) ABSTRACT

A method and apparatus for handling inter-node connectivity in a wireless communication system are disclosed. The method includes transmitting a request from a first network node to a second network node to stop aggregating a SCell (Secondary Cell) for a UE (User Equipment); wherein the first network node controls the SCell and the second network node controls PCell (Primary Cell) of the UE. Also, another method and apparatus for handling inter-node connectivity in a wireless communication system are disclosed. The method includes transmitting a request from a first network node, which controls a first serving cell of a UE (User Equipment), to a second network node, which controls a second serving cell of the UE, to change a data path corresponding to a first type of transmission and/or reception of the UE from a first path to a different path; wherein the first path is via the first network node and used as the data path corresponding to the first type of transmission and/or reception of the UE, and a second path is via the second (Continued)

network node and used as a data path corresponding to a second type of transmission and/or reception of the UE. In addition, an alternative method and apparatus for handling inter-node connectivity in a wireless communication system are disclosed. The method includes transmitting a request from a first network node to a core network node to change a data path corresponding to a first type of transmission and/or reception of a UE (User Equipment) from a first path to a different path; wherein the first path is via the first network node and used as the data path corresponding to the first type and a third type of transmission and/or reception of the UE, a second path is via a second network node and used as a data path corresponding to a second type of transmission and/or reception of the UE, and the request does not indicate to change the data path corresponding to the third type of transmission and/or reception of the UE.

24 Claims, 6 Drawing Sheets

(51) Int. Cl.
*H04W 36/28* (2009.01)
*H04W 92/20* (2009.01)
*H04L 5/00* (2006.01)

(56) References Cited

U.S. PATENT DOCUMENTS

| | | | | |
|---|---|---|---|---|
| 2012/0106511 | A1 | 5/2012 | Wu | |
| 2012/0140743 | A1 | 6/2012 | Pelletier et al. | |
| 2013/0176988 | A1* | 7/2013 | Wang | H04W 28/08 370/331 |
| 2013/0183970 | A1* | 7/2013 | Chen | H04W 36/30 455/436 |
| 2013/0303224 | A1* | 11/2013 | Sambhwani | H04W 28/10 455/517 |
| 2014/0010207 | A1* | 1/2014 | Horn | H04W 36/165 370/332 |
| 2014/0177446 | A1* | 6/2014 | Sun | H04L 45/38 370/236 |
| 2014/0204777 | A1* | 7/2014 | Huang | H04W 36/28 370/252 |
| 2014/0334427 | A1* | 11/2014 | Sun | H04W 72/04 370/329 |
| 2015/0085730 | A1* | 3/2015 | Sun | H04W 52/0235 370/311 |
| 2015/0264612 | A1* | 9/2015 | Baek | H04W 76/04 370/331 |

FOREIGN PATENT DOCUMENTS

| | | | |
|---|---|---|---|
| JP | 2011176722 | A | 9/2011 |
| JP | 2012019313 | A | 1/2012 |
| JP | 2014022895 | A | 2/2014 |
| KR | 1020120046692 | A | 5/2012 |

OTHER PUBLICATIONS

Search Report on corresponding EP Patent Application No. 14152813.3 dated Jul. 30, 2014.
LTE-Advanced: An Operator Perspective.
Office Action on corresponding JP Patent Application No. 2014-013920 dated Jan. 6, 2015.
Office Action on corresponding KR Patent Application No. 10-2014-0009620 dated Jan. 21, 2015.
Office Action on corresponding JP Patent Application No. 2015-107120 dated Apr. 5, 2016.

* cited by examiner

METHOD AND APPARATUS FOR HANDLING INTER-NODE CONNECTIVITY IN A WIRELESS COMMUNICATION SYSTEM

CROSS-REFERENCE TO RELATED APPLICATIONS

The present Application claims the benefit of U.S. Provisional Patent Application Ser. No. 61/758,418 filed on Jan. 30, 2013 and U.S. Provisional Patent Application Ser. No. 61/768,761 filed on Feb. 25, 2013. The entire disclosures of these U.S. Provisional Patent Applications are incorporated herein by reference.

FIELD

This disclosure generally relates to wireless communication networks, and more particularly, to a method and apparatus for handling inter-node connectivity in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus for handling inter-node connectivity in a wireless communication system are disclosed. The method includes transmitting a request from a first network node to a second network node to stop aggregating a SCell (Secondary Cell) for a UE (User Equipment); wherein the first network node controls the SCell and the second network node controls PCell (Primary Cell) of the UE.

Furthermore, another method and apparatus for handling inter-node connectivity in a wireless communication system are disclosed. The method includes transmitting a request from a first network node, which controls a first serving cell of a UE (User Equipment), to a second network node, which controls a second serving cell of the UE, to change a data path corresponding to a first type of transmission and/or reception of the UE from a first path to a different path; wherein the first path is via the first network node and used as the data path corresponding to the first type of transmission and/or reception of the UE, and a second path is via the second network node and used as a data path corresponding to a second type of transmission and/or reception of the UE.

In addition, an alternative method and apparatus for handling inter-node connectivity in a wireless communication system are disclosed. The method includes transmitting a request from a first network node to a core network node to change a data path corresponding to a first type of transmission and/or reception of a UE (User Equipment) from a first path to a different path; wherein the first path is via the first network node and used as the data path corresponding to the first type and a third type of transmission and/or reception of the UE, a second path is via a second network node and used as a data path corresponding to a second type of transmission and/or reception of the UE, and the request does not indicate to change the data path corresponding to the third type of transmission and/or reception of the UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. TR 36.932 v12.0.0, "Scenarios and Requirements for Small Cell Enhancements for E-UTRA and E-UTRAN (Release 12)"; RP-122033, "New Study Item Description: Small Cell enhancements for E-UTRA and E-UTRAN—Higher-layer aspects", NTT DOCOMO, INC.; TS 36.300 V11.4.0, "E-UTRA and E-UTRAN; Overall description; Stage 2"; TS 36.331 V11.2.0, "E-UTRA RRC protocol specification (Release 11)"; RWS-120046, "Technologies for Rel-12 and onwards"; and R2-130845, "TR 36.842 v0.1.0 on Study on Small Cell Enhancements for E-UTRA and E-UTRAN—Higher-layer aspects", NTT DOCOMO. The standards and documents listed above are hereby expressly incorporated herein.

Figure 1:
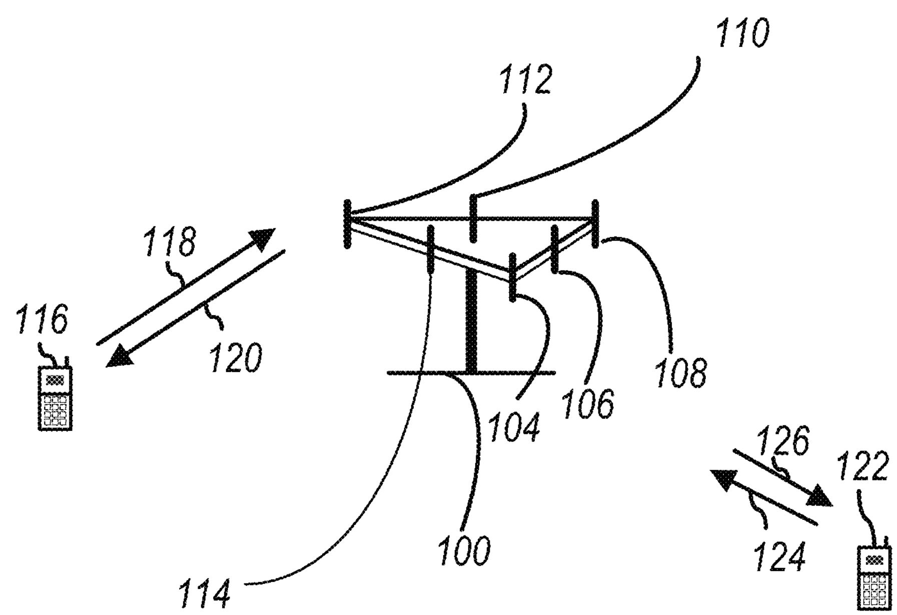
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNB, or some other terminology. An access terminal (AT) may also be called user equipment (UE), a wireless communication device, terminal, access terminal or some other terminology.

Figure 2:
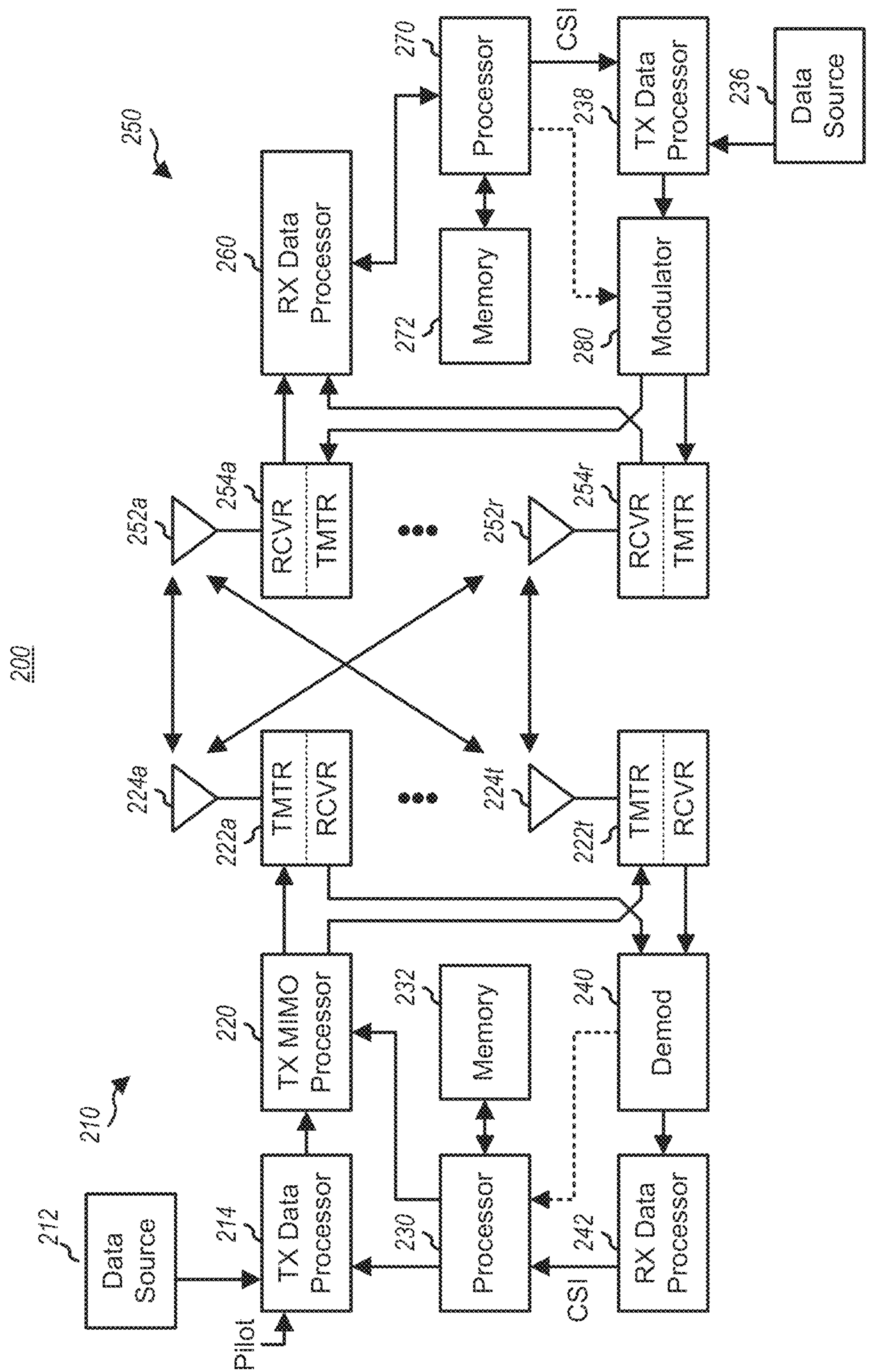
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
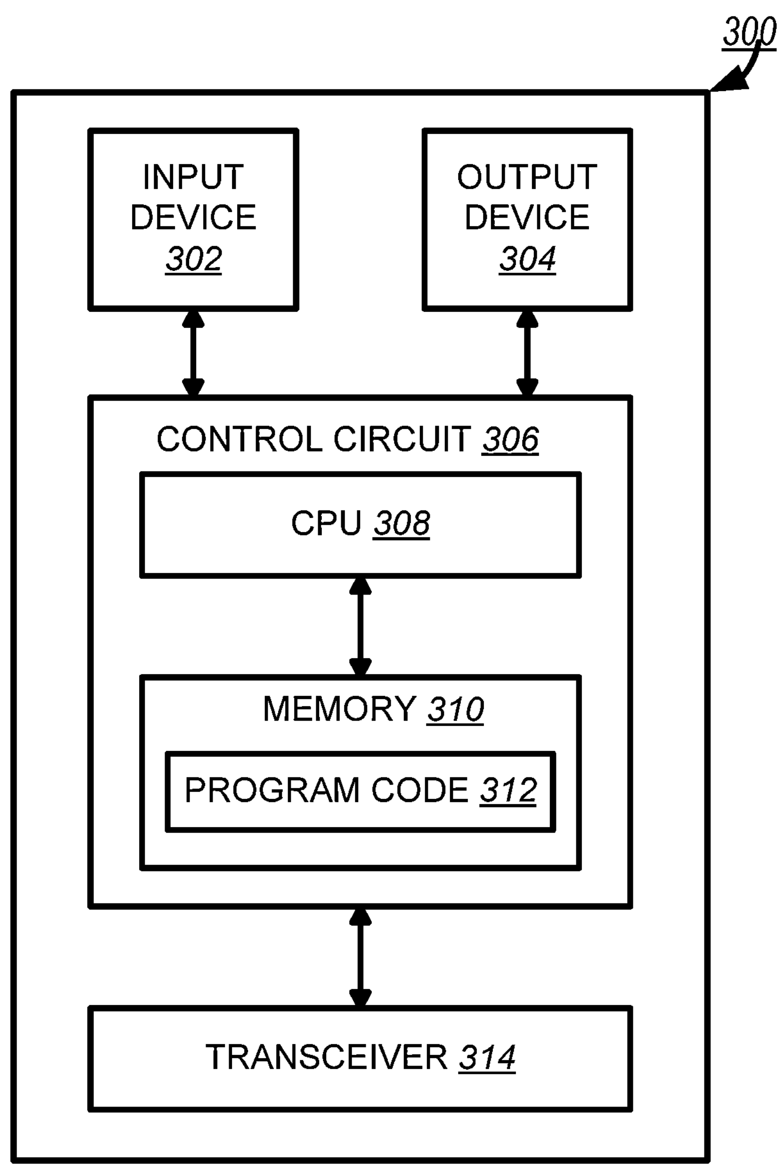
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the eNB (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
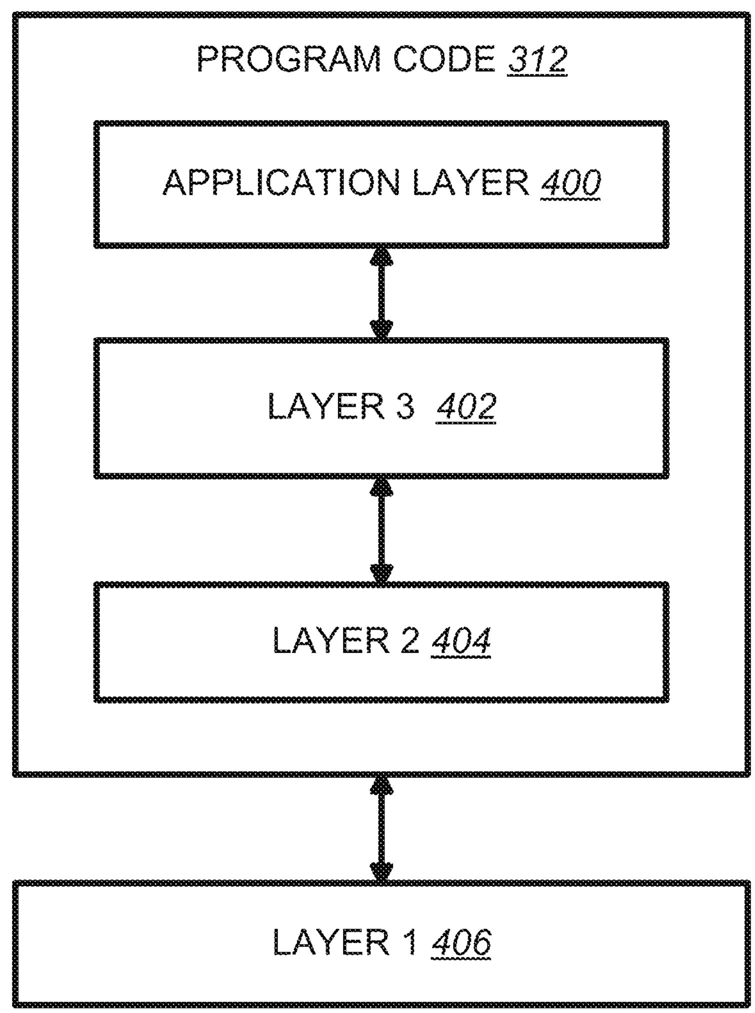
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Based on 3GPP TR 36.932 v12.0.0, a Rel-12 study item of small cell enhancement has been approved in 3GPP RP-122033. According to 3GPP RP-122033, the study item will cover the following aspects:

- Identify and evaluate the benefits of UEs having dual connectivity to macro and small cell layers served by different or same carrier and for which scenarios such dual connectivity is feasible and beneficial.
- Identify and evaluate potential architecture and protocol enhancements for the scenarios in TR 36.932 and in particular for the feasible scenario of dual connectivity and minimize core network impacts if feasible, including:
  - Overall structure of control and user plane and their relation to each other, e.g., supporting C-plane and U-plane in different nodes, termination of different protocol layers, etc.
- Identify and evaluate the necessity of overall Radio Resource Management structure and mobility enhancements for small cell deployments:
  - Mobility mechanisms for minimizing inter-node UE context transfer and signalling towards the core network.
  - Measurement and cell identification enhancements while minimizing increased UE battery consumption.

Figure 5:
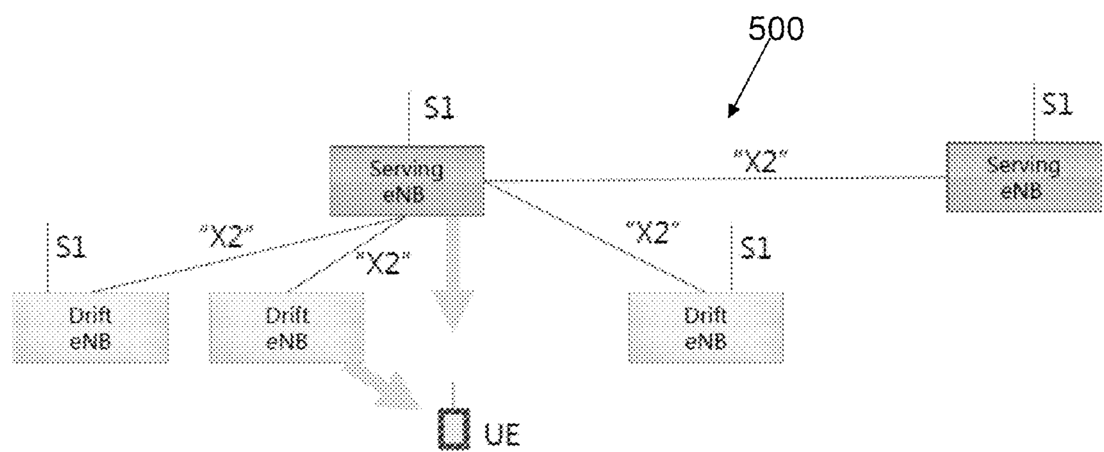
FIG. 5 illustrates a possible architecture of Inter-eNB (evolved Node B) Carrier Aggregation as discussed in 3GPP RWS-120045 according to one exemplary embodiment.

Carrier Aggregation (CA) would be a feasible mechanism to achieve dual connectivity of macro and small cells. Currently, the stage-2 and stage-3 descriptions of CA are specified in 3GPP TS 36.300 V11.4.0 and 3GPP TS 36.331 V11.2.0 respectively. While the currently specified CA is generally for intra-eNB, inter-eNB CA (where the macro and the small cells are controlled by different eNBs) has also been considered, e.g., to achieve dual connectivity in small cell enhancement as discussed in 3GPP RWS-120046. In 3GPP RWS-120046, a possible architecture is set forth as shown in FIG. 5. As shown in FIG. 5, a network node called “Serving eNB” controls a macro cell and a network node called “Drift eNB” controls a small cell.

Besides, it has been agreed that the study item approved in 3GPP RP-122033 would focus on the deployment scenarios of macro and pico cells connected via non-ideal backhaul (discussed in 3GPP TR 36.932 v12.0.0 and R2-130845). Fibre access, which can be used to deploy Remote Radio Heads (RRHs), is not assumed in the study item.

In general, if a macro and a small cell are controlled by different network node or eNB, inter-eNB CA (or inter-node CA) should be adopted to achieve dual connectivity of the macro and the small cell. In order to support inter-eNB CA (or inter-node CA), some negotiations or procedures between the eNB controlling PCell (Primary Cell) and the eNB controlling a cell that is a candidate for a SCell (Secondary Cell) may need to be defined. The PCell could be a macro cell, and the SCell could be a small cell.

Besides, in a heterogeneous network, there may be multiple SCell candidates which could be selected by an eNB controlling PCell for carrier aggregation. It may be difficult for the eNB to judge which cell is a better SCell candidate without assistance information, and aggregating a bad SCell may cause performance degradation (such as throughput reduction, resource waste, or power consumption).

Also, the details of inter-node dual connectivity are currently not clear. One possibility is that the transmission and/or reception data path may be split via different network node. The splitting may be according to different aspects (such as based on service type or on QoS requirement). A UE may have multiple data paths where each different data type would have a different data path based on the splitting rule. For example, the data path for some specific service type would be via a macro cell, and the data path for some other specific service type would be via a small cell. Under the circumstances, either data path could be considered as a partial data path of the UE.

For inter-eNB CA, a negotiation procedure for CA may be required between eNBs. A kind of CA preparation request could be used by a first eNB controlling PCell (such as a macro cell) of a UE to request the aggregation of SCell. In addition, a type of CA Accept/Reject could be used by a second eNB controlling a cell that is a candidate for a SCell (such as a small cell) to respond the first eNB. Furthermore, a type of CA Stop could be used by the first eNB to inform the second eNB to stop aggregating the SCell.

After CA is complete, the second eNB could send a request to the first eNB to release the SCell of the UE. Confirmation for the SCell release from the first eNB to the second eNB may be required. For example, in some situation (such as the SCell becomes overloaded), the second eNB would transmit a SCell release request to the first eNB. The decision and the action to release the SCell could be done by first eNB.

Furthermore, after CA is complete, the second eNB could send a request to the first eNB or a core network node (such as a MME (Mobility Management Entity) or a S-GW (Serving Gateway)), to switch a data path (such as a radio bearer, a service, or a logical channel). The switching is from between the UE and the second eNB to between the UE and the first eNB. The first eNB could also send the request to the second eNB or the core network node. Confirmation for the data path switch may be required. For example, in some situation (such as the QoS of a specific radio bearer cannot be fulfilled or the SCell becomes overloaded), the second eNB could send a request to the first eNB to switch the data path.

Also for the first eNB, the decision to aggregate a cell to be a SCell of the UE could be based on various factors (such as radio condition, interference, or UE moving speed, etc.). In addition, whether a cell is suitable to be a SCell of the UE or not would change from time to time and the change may not be easily noticed by the eNB controlling PCell.

Since some benefits to aggregate a SCell include offloading data and increasing throughput, it would be better for the first eNB to know the loading status of a cell, which can be a candidate for a SCell, when deciding whether to aggregate the cell. Such information could help the first eNB to decide which cell(s) to aggregate. In one embodiment of this invention, the second eNB, which controls a small cell or a SCell or a SCell candidate, could transmit information about its loading status to the first eNB, which controls a macro cell, or PCell. The information could be transmitted during a procedure for carrier aggregation (for example in a CA accept message). Alternatively, the information could be transmitted in a SCell release request message. Furthermore, the information could also be transmitted in a data path switch request message. More specifically, the information could include the loading level (such as low, medium, or high) of the small cell. Here is an exemplary case:

(1) When an eNB controlling PCell of a UE would like to aggregate a SCell for the UE, the eNB would transmit a CA preparation request message to the eNB that controls cell(s) which could be aggregated.

(2) The eNB, which accepts the request, would respond with a CA accept message that would include the information of the eNB's or the cell's loading status. Also, an identification of a cell to be aggregated could be included in the CA accept message.

(3) The eNB controlling PCell could decide which cell(s) should be aggregated based on the provided information.

In addition, when inter-node dual connectivity is configured to a UE, the rule of splitting data path could be configured by the network. As discussed above, the general concept is that a first eNB controlling one serving cell of a UE could send a request to a second eNB controlling another serving cell of the UE or a core network node (such as a MME or a S-GW) to switch a data path or to change a splitting rule (such as for a radio bearer, a service, or a logical channel). The data path switching could be from between the UE and a first eNB to between the UE and a second eNB. Confirmation for the data path switch or splitting rule change may be required. For example, in some situation (such as the QoS of a specific radio bearer cannot be fulfilled or the serving cell of the second eNB becomes overloaded), the second eNB could send a request to the first eNB to switch the data path or to change the splitting rule.

In addition, a second network node (such as an eNB) could send a request to a first network node (such as another eNB) to release a serving cell of a UE wherein the serving cell is controlled by the second network node. For example, in some situation (such as the UE has no more data to be transmitted to the serving cell), the second network node would transmit a serving cell release request (for example, a SCell release request) to the first network node.

Figure 6:
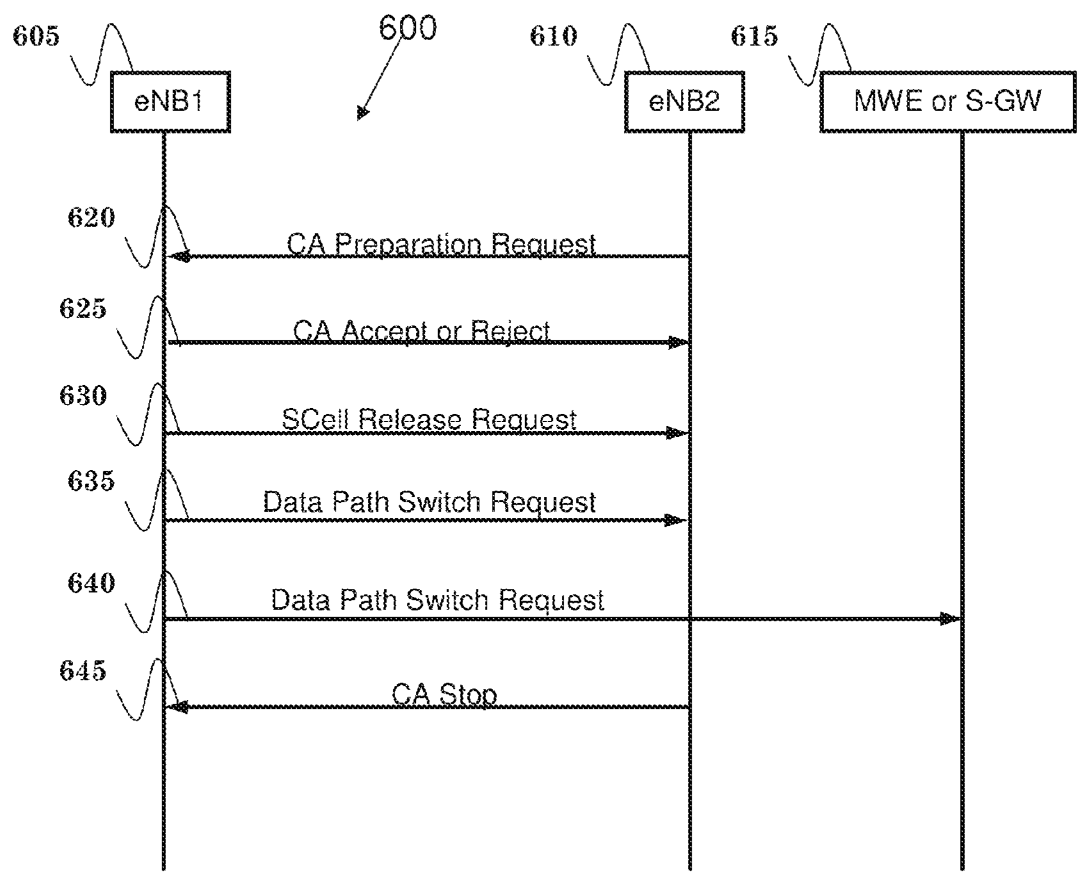
FIG. 6 is a message sequence chart according to one exemplary embodiment.

FIG. 6 is a message sequence chart 500 in accordance with one exemplary embodiment. In step 620, eNB2 610 sends a CA Preparation Request to eNB1 605. In step 625, eNB1 605 sends either a CA Accept Message or a CA Reject Message to eNB2 610. In one embodiment, the CA Accept Message could include the loading level. In step 630, eNB1 sends a SCell Release Request to eNB2. In steps 635 and 640, eNB1 could send a Data Path Switch Request either to eNB2 or to a MWE or a S-GW to change the first data path corresponding the first type of transmission and/or reception of the UE to a different data path. In step 645, eNB2 sends a CA Stop message to eNB1 to inform eNB1 to stop aggregating the SCells. A procedure for negotiation between network nodes may involve one or multiple steps above. For example, a procedure may involve both step 620 and step 625.

In one embodiment, a first network node (such as an eNB) could transmit information about its loading status to a second network node (such as an eNB) during a procedure for carrier aggregation. Further, the procedure could be used when aggregating PCell and SCell(s) controlled by different network nodes. The procedure could comprise a message transmitted between the first network node and the second network node. In addition, the first network node could control a cell which is a SCell candidate for a UE in carrier aggregation. Also, the cell could be a small cell. Besides, the second network node could control a cell which is a PCell for a UE in carrier aggregation. Furthermore, the cell could be a macro cell. The information about the loading status could be included in a response message, such as a CA accept message, for a CA preparation message or a CA request message.

In one embodiment, a first network node (such as a eNB) could transmit a request to a second network node (such as a eNB) to stop aggregating a SCell for a UE, wherein the first network node controls the SCell of the UE and the second network node controls PCell of the UE. Further, the request could be a SCell release request message. Also, the SCell could be a small cell. The PCell could be a macro cell. In addition, the request could be triggered based on factors including loading of the SCell. Alternatively, the factors could include whether or not a QoS (Quality of Service) for the UE could be guaranteed. Moreover, the request could comprise a cause for aggregation stop, such as overload. Furthermore, the first network node could release configuration or resources for the UE when a confirmation message, such as a CA stop message, a CA release message, or a CA release accept message, of the request is received from the second network node.

In one embodiment, as shown in step 635 of FIG. 6, a first network node could transmit a request to a second network node to change a data path corresponding to a first type of transmission and/or reception of a UE (User Equipment) from a first path to a different path (such as a second path).

In another embodiment, as shown in step 640 of FIG. 6, the first network node could transmit a request to a core network node (such as a MME or a S-GW) to change a data path corresponding to a first type of transmission and/or reception of the UE from a first path to a different path (such as a second path). In above embodiments, the first path is via the first network node and used as the data path corresponding to the first type of transmission and/or reception of the UE. Furthermore, the second path is via the second network node and used as a data path corresponding to a second type of transmission and/or reception of the UE.

In one embodiment, the data path corresponding to the first type of transmission and/or reception of the UE is changed to the second path due to the request. In addition, the request is not triggered by handover. In other words, the request is not transmitted due to handover.

In another embodiment, the first path could be used as a data path corresponding to a third type of transmission and/or reception of the UE. In addition, the request to change the data path corresponding to the first type of transmission and/or reception of the UE (as illustrated in steps 635 and 640 of FIG. 6) does not indicate to change the data path corresponding to the third type of transmission and/or reception of the UE. In other words, the first path would still be used as the data path corresponding to the third type of transmission and/or reception of the UE after changing the data path corresponding to the first type of transmission and/or reception of the UE due to the request. In another embodiment, the UE has multiple paths via different network nodes after the data path change. In addition, the data path is for data in uplink direction, such as from UE to eNB.

In one embodiment, the first type of transmission and/or reception, the second type of transmission and/or reception, and the third type of transmission and/or reception are differentiated based on service type. Alternatively, they could be differentiated based on radio bearer, on logical channel, and/or on QoS (Quality of Service) level.

In one embodiment, the request could be triggered based on factors including a loading of a cell controlled by the first network node. Alternatively, the factors could include whether or not a QoS (Quality of Service) corresponding to the first type of transmission and/or reception of the UE could be guaranteed. Furthermore, the request could include a cause for data path switching (such as overload). In addition, the request could include a loading status, such as a loading level indicating current loading condition (such as low, medium, or high), of a cell controlled by the first network node.

In one embodiment, the first network node could be an eNB (evolved Node B) controlling a serving cell or SCell (Secondary Cell) of the UE. The second network node could be an eNB controlling a serving cell or PCell (Primary Cell) of the UE. In addition, the first network node controls (i) a macro cell or (ii) a small cell that could be a pico cell, a femto cell, or a micro cell. Similarly, the second network node controls (i) a macro cell or (ii) a small cell that could be a pico cell, a femto cell, or a micro cell. The small cell could be controlled by a low power node. In addition, the first network node would terminate the first type of transmission and/or reception when a confirmation message (such as a data path changing accept message or a data path reconfiguration message) of the request is received.

Referring back to FIGS. 3 and 4, in one embodiment, the device 300 could include a program code 312 stored in memory 310 to handle inter-node connectivity. In one embodiment, the CPU 308 could execute the program code 312 to transmit information about its loading status to a network node during a procedure for carrier aggregation. In another embodiment, the device could transmit a request to a network node to stop aggregating a SCell for a UE, wherein (i) the device controls the SCell of the UE, and (ii) the network node control PCell of the UE. In addition, the CPU 308 could execute the program code 312 to perform all of the above-described actions and steps or others described herein.

Referring back to FIGS. 3 and 4, in one embodiment, the device 300 could include a program code 312 stored in memory 310 to handle inter-node connectivity. In one embodiment, the CPU 308 could execute the program code 312 to transmit a request to a network node to change a data path corresponding to a first type of transmission and/or reception of a UE from a first path to a different path (such as a second path), wherein (i) the first path is via the device and used as the data path corresponding to the first type of transmission and/or reception of the UE, and (ii) the second path is via the network node and used as a data path corresponding to a second type of transmission and/or reception of the UE.

In another embodiment, the device could transmit a request to a core network node to change a data path corresponding to the first type of transmission and/or reception of the UE from a first path to a different path (such as a second path), wherein (i) the first path is via the first network node and used as the data path corresponding to the first type and a third type of transmission and/or reception of the UE, (ii) a second path is via a second network node and used as a data path corresponding to a second type of transmission and/or reception of the UE, and (iii) the request does not indicate to change the data path corresponding to the third type of transmission and/or reception of the UE. In this embodiment, the core network node could be a MME or a S-GW. In addition, the CPU 308 could execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for handling inter-node connectivity in a wireless communication system, comprising:

receiving, by a first evolved node B (eNB), a first request from a second eNB for aggregating a Secondary Cell (SCell) for a User Equipment (UE);

transmitting an accept message from the first eNB to the second eNB in response to the first request; and transmitting a second request from the first eNB, which controls the SCell of the UE, to the second eNB, which controls a Primary Cell (PCell) of the UE, to change a data path for a first radio bearer of the UE, wherein the second request does not indicate to change the data path for a third radio bearer of the UE;

wherein a first path is via the first eNB and used as the data path for the first radio bearer and the third radio bearer before changing the data path for the first radio bearer.

2. The method of claim 1, wherein the data path for the first radio bearer is changed to a second path, wherein the second path is via the second eNB and used as a data path for a second radio bearer of the UE.

3. The method of claim 1, wherein the second request includes a cause for data path changing.

4. The method of claim 1, wherein the UE has multiple paths via different eNBs after the data path for the first radio bearer change.

5. The method of claim 1, further comprising:

receiving, by the first eNB, a confirmation message from the second eNB for changing the data path for the first radio bearer.

6. The method of claim 1, wherein the second request comprises information about loading status of a cell controlled by the first eNB.

7. A method for handling inter-node connectivity in a wireless communication system, comprising:

transmitting a first request from a second evolved Node B (eNB) to a first evolved Node B (eNB) for aggregating a Secondary Cell (SCell) for a User Equipment (UE);

receiving, by the second eNB, an accept message from the first eNB in response to the first request;

receiving, by the second eNB which controls a Primary Cell (PCell) of the UE, a second request from the first eNB which controls the SCell of the UE; and changing a data path for a first radio bearer of the UE and not changing a data path for a third radio bearer of the UE based on the second request;

wherein a first path is via the first eNB and used as the data path for the first radio bearer and the third radio bearer before changing the data path for the first radio bearer.

8. The method of claim 7, wherein the data path for the first radio bearer is changed to a second path, wherein the second path is via the second eNB and used as a data path for a second radio bearer of the UE.

9. The method of claim 7, further comprising:

transmitting a confirmation message from the second eNB to the first eNB for changing the data path for the first radio bearer.

10. The method of claim 7, wherein the UE has multiple paths via different eNBs after the data path for the first radio bearer change.

11. The method of claim 7, wherein the second request comprises information about loading status of a cell controlled by the first eNB.

12. The method of claim 1, wherein the first eNB terminates transmission and/or reception of the first radio bearer when receiving a confirmation message for the second request.

13. A communication device to handle inter-node connectivity in a wireless communication system, comprising:

a control circuit;

a processor installed in the control circuit;

a memory installed in the control circuit and operatively coupled to the processor;

wherein the processor is configured to execute a program code stored in the memory to handle inter-node connectivity by:

receiving, by a first evolved node B (eNB), a first request from a second eNB for aggregating a Secondary Cell (SCell) for a User Equipment (UE);

transmitting an accept message from the first eNB to the second eNB in response to the first request; and transmitting a second request from the first eNB, which controls the SCell of the UE, to the second eNB, which controls a Primary Cell (PCell) of the UE, to change a data path for a first radio bearer of the UE, wherein the second request does not indicate to change the data path for a third radio bearer of the UE;

wherein a first path is via the first eNB and used as the data path for the first radio bearer and the third radio bearer before changing the data path for the first radio bearer.

14. The communication device of claim 13, wherein the data path for the first radio bearer is changed to a second path, wherein the second path is via the second eNB and used as a data path for a second radio bearer of the UE.

15. The communication device of claim 13, wherein the second request includes a cause for data path changing.

16. The communication device of claim 13, wherein the UE has multiple paths via different eNBs after the data path for the first radio bearer change.

17. The communication device of claim 13, wherein the program code further comprises:

receiving, by the first eNB, a confirmation message from the second eNB for changing the data path for the first radio bearer.

18. The communication device of claim 13, wherein the second request comprises information about loading status of a cell controlled by the first eNB.

19. The communication device of claim 13, wherein the first eNB terminates transmission and/or reception of the first radio bearer when receiving a confirmation message for the second request.

20. A communication device to handle inter-node connectivity in a wireless communication system, comprising:

a control circuit;

a processor installed in the control circuit;

a memory installed in the control circuit and operatively coupled to the processor;

wherein the processor is configured to execute a program code stored in the memory to handle inter-node connectivity by:

transmitting a first request from a second evolved Node B (eNB) to a first evolved Node B (eNB) for aggregating a Secondary Cell (SCell) for a User Equipment (UE);

receiving, by the second eNB, an accept message from the first eNB in response to the first request;

receiving, by the second eNB which controls a Primary Cell (PCell) of the UE, a second request from the first eNB which controls the SCell of the UE; and changing a data path for a first radio bearer of the UE and not changing a data path for a third radio bearer of the UE based on the second request;

wherein a first path is via the first eNB and used as the data path for the first radio bearer and the third radio bearer before changing the data path for the first radio bearer.

21. The communication device of claim 20, wherein the data path for the first radio bearer is changed to a second path, wherein the second path is via the second eNB and used as a data path for a second radio bearer of the UE.

22. The communication device of claim 20, wherein the program code further comprises:

transmitting a confirmation message from the second eNB to the first eNB for changing the data path for the first radio bearer.

23. The communication device of claim 20, wherein the UE has multiple paths via different eNBs after the data path for the first radio bearer change.

24. The communication device of claim 20, wherein the second request comprises information about loading status of a cell controlled by the first eNB.

* * * * *